United States Patent Office 3,830,771
Patented Aug. 20, 1974

3,830,771
PHOSPHORUS-CONTAINING POLYESTERS
Stuart Lyle Cohen, Charlotte, N.C., and Robert William Stackman, Morristown, N.J.; said Stackman assignor to Celanese Corporation, New York, N.Y.; said Cohen assignor to Fiber Industries, Inc.
No Drawing. Continuation-in-part of application Ser. No. 51,019, June 29, 1970. This application June 25, 1971, Ser. No. 156,949
The portion of the term of the patent subsequent to June 25, 1991, has been disclaimed
Int. Cl. C08g 51/02; C09k 3/28
U.S. Cl. 260—40 R    5 Claims

ABSTRACT OF THE DISCLOSURE

Phosphorous-containing polyester molding resin compositions having improved flame retardant properties wherein said polyester compositions comprise melt blends of a reinforcing agent, a synthetic linear polypropylene terephthalate or polybutylene terephthalate, and up to about 30 percent, based on the weight of polyester, of a polyphosphonate or poly(phosphonate-phosphate) having the following general formula.

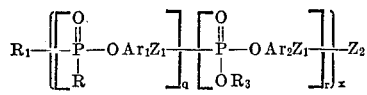

wherein $R_1$ is a monovalent radical having up to about 20 carbon atoms selected from the group consisting of alkoxy, aryloxy, hydroxy, haloalkoxy, haloaryloxy, hydroxyalkoxy, and hydroxyaryloxy; $R_2$ is a monovalent radical having up to 20 carbon atoms selected from the group consisting of hydrogen, alkyl, aryl, haloalkyl, and haloaryl; $R_3$ is a monovalent radical having up to 20 carbon atoms selected from the group consisting of alkyl, aryl, haloalkyl and haloaryl; $Ar_1$ and $Ar_2$ are divalent radicals each having up to about 20 carbon atoms independently selected from the group consisting of arylene and haloarylene; $Z_1$ is a divalent radical selected from the group consisting of alkylene, arylene, haloalkylene, haloarylene, oxy, thio, and sulfonyl, $Z_2$ is either hydrogen or

$q$ is an integer of at least 1; $r$ is 0 or an integer of at least 1; $x$ is greater than 1. The most preferred polyphosphonate is poly($m$-phenylene phenylphosphonate). The most preferred copolymer is poly[($m$-phenylene phenylphosphonate)$_q$($m$-phenylene phenylphosphonate)$_r$] where $q/r$ is greater than 3.

This application is a continuation-in-part of Application Ser. No. 51,019 filed June 29, 1970.

BACKGROUND OF THE INVENTION

This invention relates to reinforced synthetic linear polyester molding resin compositions containing phosphorus. More particularly, the invention relates to melt-blends of reinforcing agents, synthetic linear polypropylene terephthalate or polybutylene terephthalate and polyphosphonates or poly(phosphonate-phosphate) copolymers, which impart flame retardant properties to said compositions.

Recent investigations with reinforced polypropylene terephthalate and polybutylene terephthalate molding resins have found them to be surprisingly superior to similarly reinforced polyethylene terephthalate in many important processing and performance characteristics. For example, polypropylene terephthalate and polybutylene terephthalate can be molded and otherwise processed at lower temperatures, have a shorter cycle time in the mold and do not require, as does the polyethylene terephthalate, the presence of either a nucleating agent to induce crystallinity or a mold-release agent. Furthermore, reinforced polypropylene terephthalate and polybutylene terephthalate molding resins have correspondingly higher tensile strength, lower water absorption and better creep (flexural) properties than does similarly reinforced polyethylene terephthalate. As a direct result, these polypropylene terephthalate and polybutylene terephthalate molding resins which were first disclosed, along with polyethylene terephthalate in U.S. Pat. 2,465,319 issued to Whinfield and Dickson, have been found to solve processing problems long associated with polyethylene terephthalate and believed, by those skilled in the art, to be equally associated with all polyalkylene terephthalates. Equally as significant these molding resins present a noticeably improved balance of performance properties which those skilled in the art did not believe to exist, witness the extensive use of polyethylene terephthalate molding resins to the almost total exclusion of other polyalkylene terephthalates. Consequently, the superior processing requirements and physical properties of polypropylene terephthalate and polybutylene terephthalate molding resins makes them more commercially desirable, with a wider area of applicability than polyethylene terephthalate.

These molding resins do, however, have one considerable drawback—they are flammable. Quite significantly, the presence of many important reinforcing agents, such as glass, enhances rather than deters the burning rate of these molding resins. Since the reinforcing agents have a direct effect on the desirable physical-mechanical properties of these molding resins, several commercially advantageous applications are precluded.

This invention is concerned with molding resins, i.e., resins useful for producing articles of substantial thickness, i.e., thicknesses greater than 10 mils. Articles which may be produced are construction panels, refrigerator doors, pipes, rods, automobile panels, sheeting, etc. Such molded articles do not include those which have a very small dimension such as fibers and thin film. The difficulties to be expected when molding the basic reinforced polyester resin system to form articles of substantial thickness are set out in U.S. Pat. 3,516,957. Surprisingly, it has been found that reinforced, especially glass-reinforced, polypropylene terephthalate or polybutylene terephthalate molding resins do not require either a nucleating agent or mold release agent, the necessity for the incorporation of the combination of which forms the basis of the invention claimed in that patent. Reinforced polypropylene terephthalate and polybutylene terephthalate molding resins are the subject of copending U.S. Application Ser. No. 854,259, filed Aug. 29, 1969.

SUMMARY OF THE INVENTION

It is an object of the present invention to provide reinforced polyalkylene terephthalate molding resins, specifically polypropylene terephthalate and polybutylene terephthalate, with intrinsic viscosities in the range of from about 0.2 to about 1.2 deciliters per gram, having reduced burning or self-extinguishing properties.

It is another object of this invention to provide a reinforced molding resin composition which is capable of being used to produce flame-retardant shaped articles.

It is still another object of the present invention to provide a molding resin composition which is capable of providing flame-retardant shaped articles without detrimentally affecting other desirable properties of said shaped articles.

These and other objects will be apparent to those skilled in the art from a consideration of the description and claims which follow.

In accordance with the present invention, flame-retardant polyester compositions are obtained by melt-blending a polyphosphonate or a poly(phosphonate-phosphate), a linear synthetic polypropylene terephthalate or polybutylene terephthalate and a reinforcing agent, wherein said polyphosphonate or poly(phosphonate-phosphate) may be represented by the following general formula:

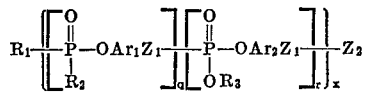

wherein $R_1$ is a monovalent radical having up to about 20 carbon atoms selected from the group consisting of alkoxy, aryloxy, hydroxy, haloalkoxy, haloaryloxy, hydroxyalkoxy, and hydroaryloxy; $R_2$ is a monovalent radical having up to 20 carbon atoms and selected from the group consisting of hydrogen, alkyl, aryl, haloalkyl, and haloaryl; $R_3$ is a monovalent radical having up to 20 carbon atoms and selected from the group consisting of alkyl, aryl, haloalkyl and haloaryl; $Ar_1$ and $Ar_2$ are divalent radicals each having up to about 20 carbon atoms independently selected from the group consisting of arylene and haloarylene; $Z_1$ is a divalent radical selected from the group consisting of alkylene, arylene, haloalkylene, haloarylene, oxy, thio, and sulfonyl; $Z_2$ is either hydrogen or

$q$ is an integer of at least 1; $r$ is 0 or an integer of at least 1; $x$ is greater than 1. The most preferred homopolymer is a poly($m$-phenylene phenylphosphonate) wherein $R_1$ is a phenoxy; $R_2$ is phenyl, $Ar_1$ is $m$-phenylene, $m$ is 1, $n$ and $p$ each are 0, $Z_2$ is

The most preferred copolymer is the copolymer poly[($m$ - phenylene phenylphosphonate)$_q$($m$ - phenylene phenylphosphate)$_r$] where $q/r$ is greater than 3. The poly(phosphonate-phosphate) copolymers are economically attractive compared to poly-phosphonate homopolymers. In the reinforced molding resin compositions of the invention, the polyphosphonate or poly(phosphonate-phosphate) is present in the compositions in an amount up to about 30 weight percent, based on the weight of the polyalkylene terephthalate. The preferred range of polyphosphonate or poly(phosphonate-phosphate) incorporation is from about 3 weight percent to about 15 weight percent. The reinforcing agent is present in an amount of from about 2 to about 60 weight percent based on the weight of the total composition, preferably from about 5 to about 40 weight percent.

DETAILED DESCRIPTION OF THE INVENTION

The base of the molding resins of this invention is a polyalkylene terephthalate polymer selected from the group consisting of polypropylene terephthalate and polybutylene terephthalate. These polymers, which are of the general type described in U.S. Pat. No. 2,465,319 to Whinfield and Dickson, can be produced by the reaction of a dibasic acid, such as terephthalic acid or a dialkyl ester of terephthalic acid (especially dimethyl terephthalate), and diols having 3 or 4 carbon atoms. Suitable diols include 1,3-propanediol, 1,4-butanediol, 1,3-butanediol, 1,2-propanediol, 1,2-butanediol, 2,3-butanediol, and the like.

In the productions of the polymers used in this invention, i.e., polypropylene or polybutylene terephthalate, the appropriate bis (hydroxyalkyl) terephthalate is produced as the intermediate. The bis (hydroxyalkyl) terephthalate can be prepared by reacting the dialkyl ester of terephthalic acid in which the alkyl radicals can contain from 1 to 7 carbon atoms with about two molecular proportions of the diols described above. It is preferred to use higher proportions of the diol, i.e., in excess of 1.5 moles of the diol per mole of the terephthalate derivative, because by using such proportions, the initial transesterification is caused to take place more rapidly and completely.

The reaction for the esterification is conducted under conditions of elevated temperatures and atmospheric, subatmospheric or superatmospheric pressure. Normally, the desired temperatures of the reaction can range from about the boiling temperature of the reaction mixture to as high as 250° C. if desired.

It is preferred that synthetic linear polyesters of the present invention containing moieties from 1,4-butanediol as the diol component be prepared in the absence of group VA catalysts. Thus it is preferred that such polyesters be prepared in accordance with e.g., Examples 13 and 23 of copending and commonly assigned application Ser. No. 879,618, filed on Nov. 24, 1969.

The polyphosphonate or poly(phosphonate-phosphate) may be admixed with the polyester in any convenient and effective manner. The polyphosphonate is generally the more viscous of the two, and therefore melt blending of sufficient duration is required to effect intimate admixture.

After the polymer base is prepared, the reinforcing agents can be intimately blended by either dry blending or melt blending, blended in extruders, heated rolls or other type of mixers. If desired, the reinforcing agents can be blended with the monomers in the polymerization reaction as long as the polymerization reaction is not affected. Alternatively, the reinforcing agent can be added after polymerization and prior to extrusion. The types of reinforcing agents which can be used include, among others, glass fibers (chopped or continuous rovings), asbestos, cellulosic fibers, cotton fabric paper, synthetic fibers, metallic powders and the like. The amount of reinforcing agent can range from about 2 to about 60 weight percent, preferably from about 5 to about 40 weight percent based on the total molding composition. Other additives for appearance and property improvements can be incorporated into the molding resins of this invention such as colorants, plasticizers, stablizers, hardeners, and the like.

The sequence of mixing is generally not critical. Either the reinforcing agent or polyphosphonate or poly(phosphonate-phosphate) may first be admixed with the polyester, or both additives may be simultaneously admixed with the polyester. It is preferred, however, that because of its viscosity, the polyphosphonate or poly(phosphonate-phosphate) be admixed with the polyester before the other additives.

Glass reinforced polybutylene terephthalate and polypropylene terephthalate resins have important advantages over the equivalent glass reinforced polyethylene terephthalate. Compound to polyethylene terephthalate, polybutylene terephthalate and polypropylene terephthalate can be processed at much lower temperatures, at a significantly lower cycle time and with a lower mold temperature. In addition they have noticeably higher notched Izod and tensile impact, less shrinkage and lower water absorption than does polyethylene terephthalate. Also, the ends of the reinforcing agent, especially glass, do not tend to migrate to the surface, thereby rendering it of uneven gloss or blemished. All of these improved processing and physical characteristics of the glass reinforced polybutylene terephthalate and polypropylene terephthalate resins are highly desirable and have direct commercial ramifications, when compared to equivalent glass reinforced polyethylene terephthalate resin.

More importantly though, these improvements in processability and physical characteristics between polyethylene terephthalate on one hand and polypropylene terephthalate and polybutylene terephthalate on the other hand are so disproportionate as to lead one to the conclusion that polypropylene terephthalate and polybutylene terephthalate are different, at least physically, from polyethylene terephthalate. That is, the improvements realized by this seemingly small change in chemical structure are so out of proportion, relative to what would and should be expected, as to make polypropylene terephthalate and polybutylene terephthalate entirely distinct from and unrelated to polyethylene terephthalate.

These new resins do, however, have one deleterios property—they are flammable and when burning, drip a significant quantity of flaming particles. In the hereinafter described burn test, 30 weight percent glass reinforced polybutylene terephthalate is found to burn at a rate of 2.3 inches per minute; polypropylene terephthalate burns at a similar rate. To those skilled in the art this is an unacceptable and unsafe condition, resulting in curtailed application for these otherwise highly desirable materials.

The test procedure used involves supporting, at one end, a specimen 6 inches in length by ½ inch in width in either 1/16 inch or ⅛ inch thickness, by a clamp, with the longest dimension being vertical. A bunsen burner flame, from a burner having a 3.8 inch diameter tube and a blue flame ¾ inch in height is placed under the suspended sample so that the bottom of the sample is ⅜ inch above the top of the burner tube. The test flame is allowed to remain for 10 seconds, withdrawn, and the duration of flaming or glowing combustion of the specimen is noted. If flaming or glowing combustion of the specimen ceases within 30 seconds after removal of the test flame, it is again placed under the specimen for 10 seconds immediately after flaming or glowing combustion of the specimen stops. The burn rate is calculated as the number of inches consummed by both the bunsen flame and self-combustion during one minute. According to the present description a reinforced polypropylene terephthalate or polybutylene terephthalate is considered to have reduced burning properties if, during the above combustion conditions, the burn rate is less than 1.1 inches per minute and no dripping of flaming particles occurs.

The present invention addresses itself to the problem of the flammability of polypropylene terephthalate and polybutylene terephthalate. More specifically, it addresses itself to the problem of the flammability of an intimate blend of polypropylene terephthalate or polybutylene terephthalate with reinforcing agents because in most instances it was found that the presence of the reinforcing agent increased the burning rate of the resin.

It has been found that polyphosphonates or poly (phosphonate-phosphates) when used in accordance with this invention, effectively reduce the burning properties of reinforced polypropylene terephthalate and polybutylene terephthalate.

The polyphosphonates and poly(phoshonate-phosphate) copolymers of the present invention may be prepared by methods similar to those well known in the art. Such methods include melt condensation of aromatic diols with phenyl phosphonic dichloride (W. R. Sorenson and T. W. Campbell, "Preparative Methods of Polymer Chemistry," 2nd Edition, Wiley Interscience, New York, 1968, pp. 145–6), and the solution polymerization of aromatic diols with phosphorus chlorides. Such methods also include, for example, melt condensation of aromatic diols with four parts of phenyl phosphonic dichloride and one part of phenyl dichlorophosphate (see the Sorenson and Campbell reference mentioned above).

The phosphorus-containing polymers as described hereinbefore have molecular weights varying within a wide range. Thus, the polymers may range from oligomers (i.e., $x$ is in the range of from 2 to about 4) to polymers containing up to 100 or more repeat units (i.e., $x$ equal to 100 or more). When $R_3$ is aryl or haloaryl it is preferred that the value of $q/r$ be greater than 2, since at high levels of phosphate the polymer cross-links apparently due to exchange of the phenoxy side chain with resorcinol; and it is most preferred that the value of $q/r$ be greater than 3. However, when $R_3$ is alkyl or haloalkyl cross-linking is minimized and the preferred range of $q/r$ is ¼ to 4. Values of $q/r$ less than ¼ are undesirable since they tend to give a brown polymer, particularly at high concentrations of the copolymer additive. It is desirable that the polymers have a degree of polymerization of at least about 3. The term "degree of polymerization" refers to the value of $x$ and eliminates the necessity of calculating molecular weight ranges for all polymers encompassed by the general formula described hereinbefore. Thus, depending upon the polymer and polyester employed, it may be desirable to utilize copolymers having a degree of polymerization from about 3 to about 10. However, it may be desirable on occasion to utilize copolymers having a degree of polymerization somewhat greater than 10, perhaps as high as about 100. Additionally, the polymers with $R_3$ being aryl or haloaryl may be capped by the addition of minor amounts of an alcohol or phenol to the reaction mixture. This procedure minimizes phosphorus-chlorine bonds in the resultant copolymer which tend to discolor polyester. Further the procedure serves as a means for controlling molecular weight or degree of polymerization of the polymers.

Preferably, the phosphorus-containing copolymers of the present invention are prepared by the reaction of one part of phenyl dichlorophosphate and at least four parts of either methyl phosphonic dichloride or phenyl phosphonic dichloride with an aromatic diol such as resorcinol, hydroquinone, catechol, 4,4'-dihydroxybiphenyl, 2,2-bis-(4-hydroxyphenyl)propane, and the like.

As stated hereinbefore, the flame retardant polyester compositions of the present invention are obtained by melt-blending up to 30 weight percent of a polyphosphonate or poly(phosphonate-phosphate) copolymer as defined hereinbefore with polypropylene terephthalate or polybutylene terephthalate.

The preferred range of copolymer incorporation is from about 3 weight percent to about 15 weight percent. The most preferred range is from 3 weight percent to about 10 weight percent. The term "melt-blending" as used herein refers to the physical mixing of the copolymer additive with the polyester while the latter is in a molten state. Thus, the polymer may be added to the polymerization vessel either during or after polymerization of the polyester. Alternatively, the polymer may be mixed or blended with polyester chip and the resultant mixture melted. Obviously, the melting step in the latter procedure may be part of the extrusion operation which provides shaped articles from said flame retardant polyester composition.

As stated hereinbefore, the flame-retardant polyester compositions of the present invention are obtained by melt-blending up to 30 weight percent of a polyphosphonate or poly(phosphonate-phosphate) as defined hereinbefore with a reinforcing agent and a synthetic linear polyester also defined hereinbefore. The preferred range of polyphosphonate or poly(phosphonate-phosphate) incorporation is from about 3 weight percent to about 15 weight percent. The most preferred range is from 3 weight percent to about 10 weight percent. The weight percent of the polyphosphonate or poly(phosphonate-phosphate) is based on the weight of the polyester. The term "melt-blending" as used herein refers to the physical mixing of the polyphosphonate or poly(phosphonate-phosphate) additive with the polyester while the latter is in a molten state. Thus, the polyphosphonate or poly(phosphonate-phosphate) may be added to the polymerization vessel either during or after polymerization of the polyester.

Alternatively, the polyphosphonate or poly(phosphonate-phosphate) may be mixed or blended with polyester chip and the resultant mixture melted. Obviously, the melting step in the latter procedure may be part of the extrusion operation which provides shaped articles from said flame-retardant polyester composition.

The flame-retardant polyester compositions of the present invention may be utilized for the production of molded articles of substantial thickness by conventional methods. Such methods include injection molding, rotational molding, and melt-extruding.

The flame-retardant polypropylene terephthalate and polybutylene terephthalate composition of the present invention may be utilized in the preparation of molding compositions in pellet or powder form, which compositions may also incorporate ingredients such as glass, china clay, talc, etc.

The range of intrinsic viscosity of the polypropylene terephthalate and polybutylene terephthalate should be between about 0.2 to about 1.2 deciliter per gram with the preferred range being between about 0.5 to about 1.0 deciliters per gram. Reinforcing agents may be present from about 2 to about 60 weight percent based on the weight of the total composition, the preferred range being between about 5 to about 40 weight percent. A large variety of reinforcing agents are contemplated by the present invention such as, asbestos fibers, cellulosic fibers, cotton fabric paper, synthetic fibers, metallic powders and the like; the preferred reinforcing agent, however, is glass fiber in chopped or continuous roving form. The chopped glass fiber used can range in lengths from 1/16 inch or shorter to 1/4 inch or longer.

The polyphosphonates or poly(phosphonate - phosphates) may be incorporated in the molding resins of the present invention in any standard manner. It is preferred, however, that they be added during the polymerization reaction and, prior to the introduction of the reinforcing agent. The following examples demonstrate, without limiting the present invention, preparation of the polyalkylene resins discussed herein and a method of blending the polyphosphonate or poly(phosphonate-phosphate).

EXAMPLE I 1200 grams of dimethylterephthalate and 800 grams of 1,4-butanediol are mixed together along with an appropriate catalyst as described in the Whinfield and Dickson patent, U.S. 2,465,319, such as zinc acetate-antimony trioxide or lead oxide-zinc oxide. The temperature is increased to approximately 200° C. when 80 percent by weight of the methanol has been removed. Vacuum is applied and the temperature is raised to 240°–250° C. When the intrinsic viscosity has reached 0.65 to 0.70 dl./g., vacuum is broken and 150 grams of poly(m-phenylene phenylphosphonate) are added under nitrogen. The mass is then mixed for 5 to 10 minutes and the resultant polymer discharged and chipped in the usual manner.

The chips which have an intrinsic viscosity of 0.70 dl./gm. were blended with an amount of 1/8 inch glass fibers, equal to 30% of their weight, tumble blended for 1 minute melting the polybutylene terephthalate and then extrusion blended by force feeding through a one inch single screw extruder with a strand die. The temperatures of the extruder and die ranged from 500 to 510° F. The strands were ground in a milling type mixer to pass through a large screen (4 mesh or smaller).

EXAMPLE II

Example I was repeated, but the amount of poly(m-phenylene phenylphosphonate) was increased to 345 grams. The chips, which had an intrinsic viscosity of 0.70 dl./gm. were mixed with an amount of glass fibers equal to 30% of their weight and processed in the same manner as in Example I.

EXAMPLE III

The products of Examples I and II were tested for flame retardance in accordance with Underwriters Laboratories Test No. 94. The resins were first molded into bars 0.5" x 1/8" x 6". Then they were positioned vertically over a Fischer burner at a distance of 3/8". The flame caused immediate ignition and was held for 10.0 seconds before being removed.

The results are summarized in the following table:

TABLE I

| Sample | Burning rate |
|---|---|
| Example I: | |
| a | 2"/54 seconds. |
| b | 2"/75 seconds. |
| c | Flame self-extinguished in 4 seconds after removal of burner; reignition for 10 seconds—article burned 2" in 26 seconds. |
| Example II: | |
| a | Flame self-extinguished in 4 seconds after removal of burner; reignition for 10 seconds—flame self-extinguished in 46 seconds after burner was removed. |
| b | Flame self-extinguished in 3.2 seconds after first ignition and in 2.5 seconds after the second ignition. |
| Control (no polyphosphonate): | |
| a | 2.3"/min; dripped flaming particles and |
| b | not self-extinguish. |

The differences in results for the samples of each example are due to inadequate mixing of the polyphosphonate with the polyester; thereby showing that intimate mixing is a necessity.

EXAMPLE IV

When Examples I and II are duplicated with the substitution of a copolymer of the average formula poly[(m-phenylene phenylphosphonate)]4[(m-phenylene phenylphosphate)] for poly(m-phenylene phenylphosphonate) and the resultant molding compositions are tested by the procedure of Example III, the results are similar to the results in Example III.

EXAMPLE V

The limiting oxygen index is a relatively recent procedure for evaluating the flammability of polymeric materials [C. P. Fenimore and F. J. Martin, *Combustion and Flame, 10,* 135 (1966); C. P. Fenimore and G. W. Jones, *Combustion and Flame, 10,* 295 (1966); and C. P. Fenimore and F. J. Martin, *Modern Plastics, 43,* 141 (1966)]. The procedure basically consists of measuring the minimum percentage of oxygen in an oxygen-nitrogen atmosphere capable of sustaining a candle-like flame on the top of a vertically mounted sample. This limiting or minimum percentage of oxygen guarantees total consumption of the sample and is referred to as the limiting oxygen index.

The oxygen index apparatus is comprised of a glass combustion chamber and means for introducing an oxygen-nitrogen mixture at a known rate of flow, the composition of which mixture may be varied and monitored continuously. The combustion chamber consists of a sample holder which is centrally located and oxyhydrogen microflame located adjacent to the sample holder. The lower portion of the combustion chamber contains glass beads to a depth of about 12 inches in order to insure a uniform gas flow of about 3 cm.³/sec.

Samples for use in the oxygen index apparatus are prepared by pouring powdered polymer into a Teflon tube, which is 1/2 inch in diameter and closed at the bottom, mounted vertically in a heated aluminum block. The polymer powder is poured into the Teflon tube under a nitrogen purge, gently packed, and heated to 285° C. After 5 minutes the tube is withdrawn, allowed to cool, and the Teflon stripped away, leaving a polymer plug.

The sample polymer plug is supported vertically in the sample holder of the combustion chamber and is ignited with the oxy-hydrogen microflame. If a burn is unattainable, the oxygen level is recorded and raised. If a steady, candle-like flame is obtained, the oxygen concentration is recorded, the flame extinguished, and the procedure repeated at a lower oxygen concentration. This procedure is followed until the minimum concentration capable of sustaining a steady-state flame is determined from both directions. Only a centrally-located flame on a flat horizontal surface is conclusive. The minimum oxygen concentration thus determined is the limiting oxygen index.

The experimental data and limiting oxygen indices (L.O.I.) for samples of resins from Examples I and II are given in the following Table II:

TABLE II

| Sample | Trial No. | Percent O² conc. | Ignition time | Position time | Flame type | Burn type | Flame out | Bar consumed | L.O.I. |
|---|---|---|---|---|---|---|---|---|---|
| Example I | 1 | 26.0 | Immediate | 30 seconds | M | Even | 4/5.0 | 100% | |
|  | 2 | 27.0 | do | do | M | do | 3/11.0 | 100% | 27.2 |
|  | 3 | 27.5 | do | do | M | do | 2/50.0 | 100% | |
| Example II | 1 | 30.0 | do | do | M | do | 2/20 | 2% | |
|  | 2 | 29.0 | do | do | M | do | 3/2 | 2% | 29.0 |
| Control | 1 | 21.0 | do | do | M | do | 3/6 | 2% | 21.0 |

NOTE.—Similar results are obtained with glass reinforced resin.

EXAMPLE VI

Dimethyl terephthalate (58 parts), 1,4-butanediol (38.6 parts), and 0.06 part of the reaction product of tetraisopropyl titanate with diphenyl silanediol in a mole ratio of 2:1 are charged to an autoclave and heated to 150° C. Methanol is distilled. The distillation of methanol is taken to 80 percent completion while the autoclave temperature is increased to 225° C. Polycondensation then is accomplished at 250°–255° C. and at a pressure of 0.1–1.0 mm. Hg. The vacuum is released under a nitrogen purge and the autoclave charged with 0.06 part of triphenyl phosphite and 2.9 parts of poly(m-phenylene phenylphosphonate). The resultant mixture is stirred under the nitrogen atmosphere to provide good dispersion of the polyphosphonate in the melt and the resultant mixture extruded. The resultant polyester composition has a relative viscosity of 30 as determined in o-chlorophenol at 25° C. and a melting point of 222° C. as determined by differential scanning calorimetry. The polymer has a limiting oxygen index of 27.4. Similar results are obtained with glass reinforced resin.

EXAMPLE VII

The procedure of Example VI is repeated, except that the poly(m-phenylene phenylphosphonate) is omitted. The resultant polyester has a limiting oxygen index of 25.2.

EXAMPLE VIII

When the previous Examples are repeated with the exception that polypropylene terephthalate is substituted for polybutylene terephthalate, the flame retarding results are similar.

Having thus disclosed the invention, what is claimed is:

1. Phosphorus-containing reinforced polyester molding resin compositions having a limiting oxygen index of more than about 26 comprising blends of from about 2 to about 60 weight percent of a reinforcing agent, based on the total weight of the composition, a synthetic linear polyalkylene terephthalate selected from the group consisting of polypropylene terephthalate and polybutylene terephthalate, the polyalkylene terephthalate having an intrinsic viscosity in the range of from about 0.2 to about 1.2 deciliters per gram, and up to about 30 weight percent, based on the weight of the polyalkylene terephthalate, of a polyphosphonate or a poly(phosphonate-phosphate) copolymer having the following general formula:

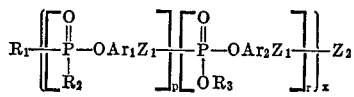

wherein $R_1$ is a monovalent radical having up to about 20 carbon atoms selected from the group consisting of alkoxy, aryloxy, hydroxy, haloalkoxy, haloaryloxy, hydroxyalkoxy, and hydroxyaryloxy; $R_2$ is a monovalent radical having up to 20 carbon atoms and is independently selected from the group consisting of hydrogen, alkyl, aryl, haloalkyl and haloaryl; $R_3$ is a monovalent radical having up to 20 carbon atoms and selected from the group consisting of alkyl, aryl, haloalkyl, and haloaryl; $Ar_1$ and $Ar_2$ are divalent radicals each having up to about 20 carbon atoms independently selected from the group consisting of arylene and haloarylene; $Z_1$ is a divalent radical selected from the group consisting of oxy and thio; $Z_2$ is either hydrogen or

$q$ is an integer of at least 1; $r$ is an integer of 0 or at least 1; and $x$ is an integer which is greater than 1.

2. The phosphorus-containing polyester compositions of claim 1 wherein said synthetic linear polyalkylene terephthalate is polybutylene terephthalate.

3. Poly(butylene) terephthalate polymer compositions of claim 2 comprising a flame retarding amount up to about 25 percent by weight of a poly(phenylene-phenylphosphonate).

4. The phosphorus-containing polyester compositions of claim 3 wherein the poly(phenylene-phenylphosphonate) is incorporated in the range of from about 3 weight percent to about 15 weight percent.

5. The phosphorus-containing polyester composition of claim 2 wherein there is present poly[(m - phenylene phenylphosphonate)$_q$(m - phenylene phenylphosphate)$_r$], said copolymer being incorporated in the range of from about 3 weight percent to about 15 weight percent, and where $q/r$ has a value greater than 2.

References Cited

UNITED STATES PATENTS

| | | | |
|---|---|---|---|
| 2,435,252 | 2/1948 | Fon Toy | 260—47 |
| 2,968,639 | 1/1961 | Caldwell et al. | 260—33.8 |
| 3,027,349 | 3/1962 | Bahr et al. | 260—45.7 |
| 3,169,925 | 2/1965 | Mahoney | 252—49.8 |
| 3,356,631 | 12/1967 | Jackson, Jr. et al. | 260—31.2 |
| 3,406,224 | 10/1968 | McDonough | 260—860 |
| 3,516,957 | 6/1970 | Gray, Jr. et al. | 260—22 |
| 3,535,300 | 10/1970 | Gable | 260—29.1 |
| 3,546,179 | 12/1970 | Koller | 260—75 |
| 3,562,220 | 2/1971 | Jones et al. | 260—40 |
| 3,575,931 | 4/1971 | Sherman | 260—75 |
| 2,636,876 | 4/1953 | Zenftman et al. | 260—47 |
| 2,964,477 | 12/1960 | Pilat et al. | 252—49.8 |
| 3,624,024 | 11/1971 | Caldwell et al. | 260—40 |

OTHER REFERENCES

Kosolapoff: "Organophosphorus Compounds," 1950, pp. 241 and 243.

DONALD E. CZAJA, Primary Examiner

R. A. WHITE, Assistant Examiner

U.S. Cl. X.R.

260—45.7 P, 45.95 D, 45.95 P, 75 P, 860